B. S. LAWSON.
ROLLER BEARING.
APPLICATION FILED MAR. 10, 1910.
999,570.
Patented Aug. 1, 1911.
2 SHEETS—SHEET 1.
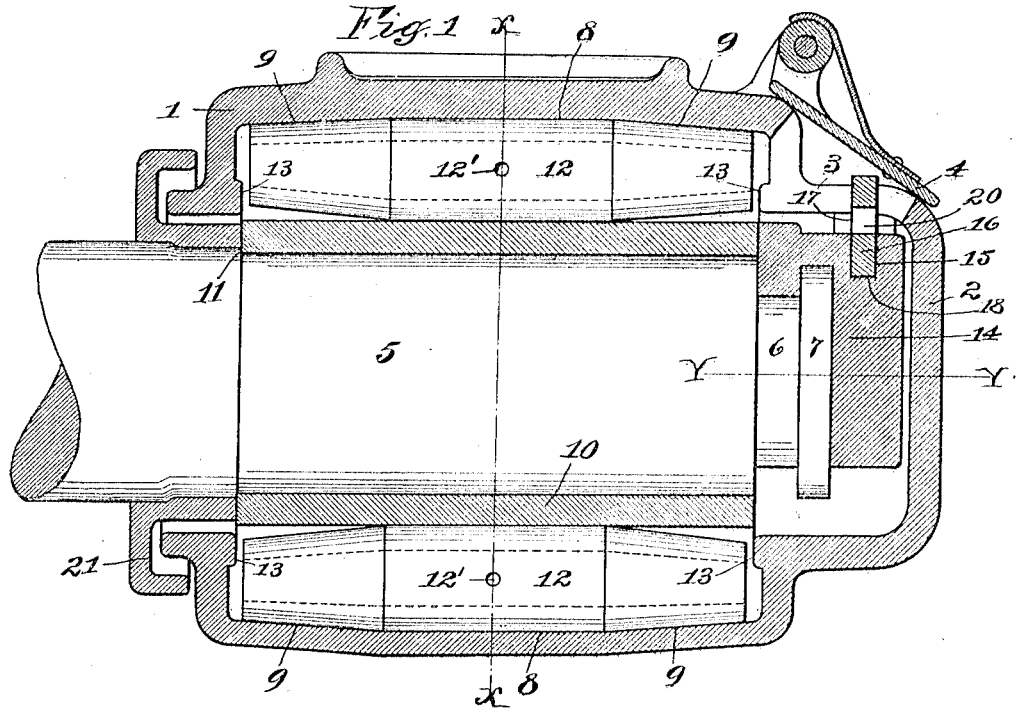
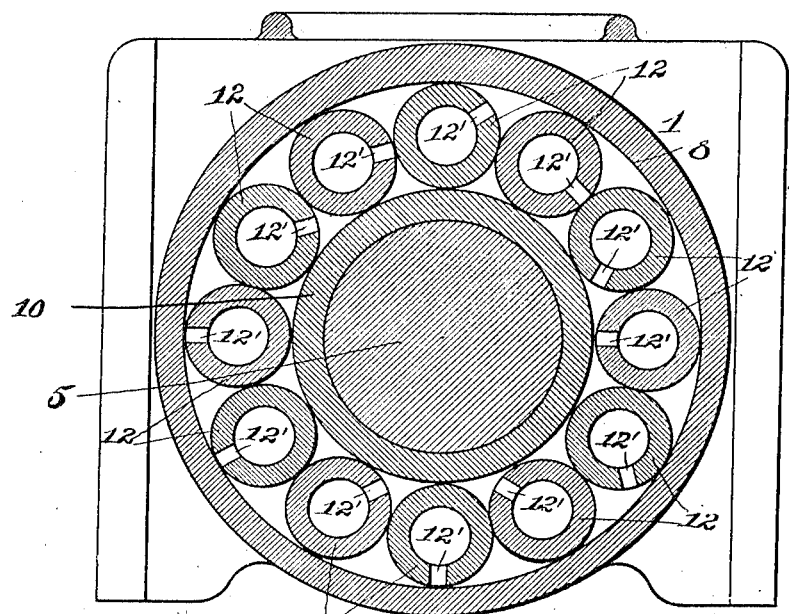
WITNESSES:
Charles W. Kirschenbaum
H. A. Lovelace
INVENTOR.
Benjamin S. Lawson
BY John J. Lavass
his ATTORNEY.

B. S. LAWSON.
ROLLER BEARING.
APPLICATION FILED MAR. 10, 1910.
999,570.
Patented Aug. 1, 1911.
2 SHEETS—SHEET 2.
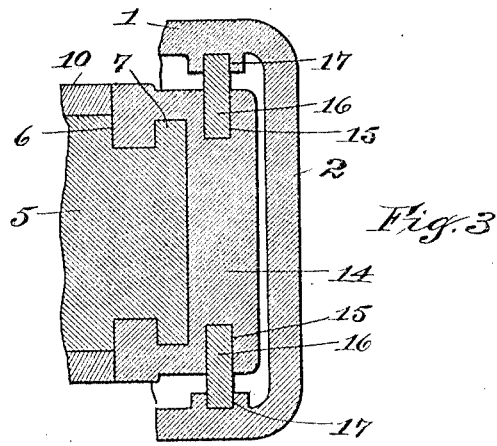
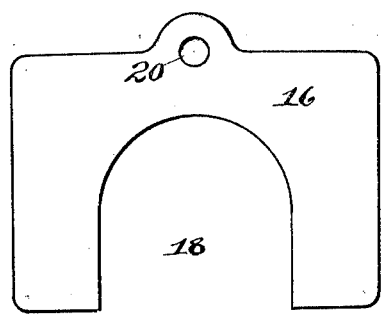
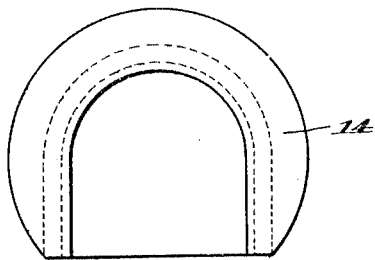
WITNESSES:
Charles W. Kirschenbaum
H. A. Lovelace
INVENTOR.
Benjamin S. Lawson
BY John J. Lauss
his ATTORNEY.

UNITED STATES PATENT OFFICE.

BENJAMIN S. LAWSON, OF BROOKLYN, NEW YORK, ASSIGNOR TO ASA L. MERRICK, OF SYRACUSE, NEW YORK.

ROLLER-BEARING.

999,570.  Specification of Letters Patent.  Patented Aug. 1, 1911.

Application filed March 10, 1910. Serial No. 548,346.

*To all whom it may concern:*

Be it known that I, BENJAMIN S. LAWSON, a citizen of the United States, and resident of Brooklyn, in the county of Queens, in the State of New York, have invented new and useful Improvements in Roller-Bearings, of which the following, taken in connection with the accompanying drawings, is a full, clear, and exact description.

This invention pertains to anti-friction journal bearings of that type which are more particularly designed for railway car-axles, and it is especially related to the style of axle-bearings embodying a box or casing having its interior formed annular to serve as the outer bearing surface for an annular series of rollers encompassing the axle disposed concentric with the roller-bearing surface, the roller-bearing surface of the axle extending part way the length of the rollers and being midway between the ends thereof.

The main object of the present invention is to provide a roller-bearing of the aforesaid character which shall be greatly simplified whereby the expense in the equipment of railway car-trucks will be materially reduced, and at the same time produce a structure which shall possess maximum strength and durability and increased efficiency, whereby it will be especially adapted for heavy railway-cars.

A further object of the invention is to provide simple and reliable means for securely connecting the end of the axle to the so-called bonnet of the box to prevent displacement of the coöperating parts of the bearing, whereby the use of end-thrust rollers and balls commonly employed in bearings of this character may be dispensed with.

Another object of the invention is to produce a construction wherein a positive and uniform distribution of lubricating-oil over the roller-bearing surfaces will be maintained.

Other objects of the invention will be apparent from the novel arrangement and combination of the component parts of the axle-bearing which will be hereinafter fully described and set forth in the claims.

In the accompanying drawings Figure 1 is a longitudinal sectional view of the roller-bearing embodying my improvements; Fig. 2 is a transverse section on the dotted line —X—X— in Fig. 1; Fig. 3 is a longitudinal section on the line —Y—Y— in Fig. 1; Fig. 4 is a detail inner face view of the yoke which straddles the end portion of the axle; and Fig. 5 is a detail face view of the plate which keys the yoke to the bonnet.

Like numerals of reference indicate like parts in the several views of the drawings.

—1— denotes the box or casing which is of the general type used in roller-bearings of car-axles.

—2— denotes the usual so-called bonnet provided on the outer end of the axle-box and is generally of rectangular shape. In the present instance this bonnet is formed integral with the box and it is provided at its top with an opening —3— extending the full width thereof to afford access to the interior, said opening being provided with the usual door —4— hinged to the top portion of the box in the well-known manner.

—5— denotes the axle formed with the usual circumferential groove —6— whereby a collar —7— is produced on the extreme end thereof.

The exterior of the box may be of any suitable or well known design, while the interior thereof is of annular shape. For a portion of the length of the box, midway between the ends thereof, the interior is formed with a cylindrical roller-bearing surface —8— which is concentric with the axle, and at the sides of the cylindrical bearing-surface the interior is gradually reduced circumferentially toward the ends of the box to provide two co-acting oppositely tapered roller-bearing surfaces —9—9— terminating at the end walls of said box all of which surfaces are case-hardened.

—10— denotes a plain bearing-sleeve which embraces the axle within the box and has its inner end abutting against a circumferential shoulder —11— formed on the axle and disposed adjacent to the corresponding end of the box, the opposite end of which sleeve is disposed flush with the inner side edge of the aforesaid groove —6— in the axle. This sleeve consists preferably of a cold-drawn steel tube which may be of any desired gage.

Between the box and bearing-sleeve is disposed a series of rollers —12—12— which are formed hollow and preferably composed of cold-drawn steel tubing. For a portion of its length, midway between the ends thereof, each roller is of plain cylindrical shape to conform to the bearing-surface —8— on the interior of the box —1—, the end portions of the roller being tapered correspondingly with the co-acting bearing-surfaces —9—9. The tapering of the rollers is preferably produced by contracting the end portions. By thus tapering the rollers, they are afforded a comparatively short bearing-surface on the sleeve —10— midway between the ends of the sleeve whereby the friction between the parts is reduced to a greater degree, and the corresponding taper of the bearing-surfaces —9—9— effectually guards against the liability of the rollers to tilt, and thus proper working positions of the parts are insured. The said hollow rollers are designed to contain waste or other material capable of absorbing lubricating-oil, and at the center of the cylindrical portion of each roller is provided a small aperture —12¹— for the exit of the oil whereby the latter is distributed over the bearing-surfaces.

On the inner sides of the end walls of the box —1— are formed annular bosses —13—13— which are concentric with the axle and are provided with vertical faces which are in close proximity to the ends of the rollers. These faces are designed to receive the end-thrust of the rollers and they are of such width and so disposed as to bear on small portions of the end faces of the rollers adjacent to the sleeve.

—14— denotes a yoke which is disposed within the bonnet —2— and straddles the end portion of the axle. This yoke is shaped to conform to the circumferential groove —6— and collar —7— of the axle and it is formed with an external groove —15— which is disposed in front of the collar. To lock the yoke to the bonnet so as to guard against longitudinal displacement of the box in relation to the axle, I provide a key —16— consisting of a vertically disposed plate which is of rectangular form and is disposed removably in two correspondingly arranged channels —17—17— formed at opposite sides of the bonnet on the interior thereof. Said plate is provided with a wide centrally disposed vertical slot —18— formed with a semi-circular upper end and extending through the lower edge thereof so as to conform to the yoke, whereby it is seated in the like shaped groove formed in the yoke at the front of the collar —7—. The aforesaid opening —3— in the top of the bonnet allows this plate to be readily removed and replaced. I prefer to provide the top portion of this plate with an aperture —20— which is designed to receive the end of a bar or other device for conveniently removing the same.

By the described arrangement of the parts it will be evident that in event of any tendency of the bearing-sleeve to shift upon the axle, the position of the rollers will not be affected. Furthermore, by locating the end-thrust for the roller as stated, it is obvious that the liability of the rollers to tilt is eliminated.

At the inner end of the box is provided the usual and well known dust-guard —21— fixed to the axle so as to encompass a flange formed on the box.

While I have shown the bearing-sleeve —10— embracing the axle, still at the same time it is obvious that this may be dispensed with, in which instance the rollers would be afforded a direct bearing upon the axle. I prefer however to use this sleeve for the reason that it obviates the expense incurred by case-hardening and machining of the axle which would be necessitated in order to provide an efficient bearing-surface for the rollers.

No claim is herein made to the yoke and its allied parts, as they are reserved and form the subject-matter of a divisional application filed on or about the 15th day of November, 1910, Serial No. 592,592.

What I claim is:—

1. In a journal-bearing of the class specified, the combination with a cylindrical axle and an axle-box; of a series of rollers interposed between said parts, each roller being provided with a central cylindrical portion and with tapered end sections, the rollers being of a length substantially equal to the interior length of the box, and bearing upon faces formed upon the interior of the box complemental in form to the outline of the rollers.

2. In a journal-bearing, the combination with the axle and the axle-box formed with end walls through which the axle extends and having its interior provided for a portion of its length midway between its ends with a cylindrical bearing-surface which is concentric with the axle, the portions at opposite sides of said cylindrical bearing-surface being gradually reduced circumferentially to provide two oppositely tapered bearing-surfaces terminating at the end walls of the box, of a series of rollers interposed between the axle and box and extending substantially the entire length of the box, the said rollers having their end portions tapered so as to conform to the tapered bearing-surfaces of the box.

3. In a journal-bearing, the combination with a cylindrical axle and axle-box formed with end walls provided with coinciding openings through which the axle extends; of a series of independent rollers interposed between said axle and box, the interior of the box being provided midway between its ends with a cylindrical main roller-bearing surface and at the opposite sides of said surface with tapering roller-bearing surfaces extending substantially to the end walls of the box.

4. The combination with an axle, a bearing-sleeve thereon, and a journal-box formed with end-walls provided with coinciding openings through which the axle extends and having its interior formed annular and disposed concentric with the sleeve, of a series or rollers interposed between the sleeve and box and extending substantially the entire length of the box, said rollers having their end portions tapered whereby they are afforded bearing-surfaces on the sleeve for a portion of its length, as set forth.

5. The combination with an axle, a plain bearing-sleeve thereon, and a journal-box having its interior formed annular and provided for a portion of its length, midway between the ends thereof, with a cylindrical roller-bearing surface which is concentric with the sleeve, the portions at opposite sides of the cylindrical bearing-surface being reduced circumferentially to provide two oppositely tapered co-acting bearing-surfaces terminating at the end of the box, of a series of rollers interposed between the sleeve and box and having their end portions tapered so as to conform to the bearing-surfaces of the box, and whereby the rollers are afforded a bearing-surface on the sleeve for a portion of the length of the sleeve and midway between its ends as set forth.

6. In a journal-bearing, the combination with an axle and axle-box having its interior formed annular and arranged concentric with the axle, of a series of hollow rollers interposed between the axle and box and extending the entire length of the box and adapted to contain a lubricant, each roller being provided at the center of its length with an aperture for distributing the lubricant over the roller-bearing surfaces as set forth.

7. The combination with an axle, a plain bearing-sleeve thereon, an axle-box having its interior formed annular and disposed concentric with the sleeve, of a series of hollow rollers interposed between the sleeve and box and extending the entire length of the box having their end portions tapered whereby they are afforded bearing-surfaces on the sleeve for a portion of its length, said rollers being adapted to contain lubricant-absorbing material and each provided at the center of its length with an aperture serving to feed the lubricant to the bearing-surfaces as set forth.

8. The combination with an axle and axle-box having its interior formed annular, of a series of rollers interposed between the axle and box and having their end portions tapered and disposed adjacent to the end walls of the box, the end-walls being formed on their inner faces with annular bosses which are out of contact with the axle and concentric therewith to receive the end-thrust of the rollers and disposed to bear on small portions of the end faces of the rollers as set forth.

BENJAMIN S. LAWSON.

Witnesses:
H. A. LOVELACE.
S. KAISER.

---

Copies of this patent may be obtained for five cents each, by addressing the "Commissioner of Patents, Washington, D. C."